United States Patent
Pearson et al.

(10) Patent No.: US 8,670,958 B2
(45) Date of Patent: Mar. 11, 2014

(54) FLASH TUBE AND FLASH VESSEL CONFIGURATION FOR PRESSURE LETDOWN

(75) Inventors: Murray S. Pearson, Oakville (CA); Umesh Vinodchandra Shah, Brampton (CA); Atanasis Plikas, Mississauga (CA)

(73) Assignee: Hatch Ltd., Mississauga, Ontario (CA)

( * ) Notice: Subject to any disclaimer, the term of this patent is extended or adjusted under 35 U.S.C. 154(b) by 35 days.

(21) Appl. No.: 13/439,170

(22) Filed: Apr. 4, 2012

(65) Prior Publication Data

US 2012/0271597 A1 Oct. 25, 2012

Related U.S. Application Data

(63) Continuation of application No. PCT/CA2009/001441, filed on Oct. 8, 2009.

(51) Int. Cl.
*G06F 17/50* (2006.01)

(52) U.S. Cl.
USPC ............................................. 703/1; 703/6

(58) Field of Classification Search
None
See application file for complete search history.

(56) References Cited

U.S. PATENT DOCUMENTS

| | | | |
|---|---|---|---|
| 5,553,778 A | 9/1996 | Jameel et al. | |
| 6,110,255 A | 8/2000 | Williams et al. | |
| 7,237,574 B2* | 7/2007 | Chipman et al. | 138/44 |
| 2002/0069923 A1 | 6/2002 | Robison et al. | |
| 2004/0012585 A1* | 1/2004 | Takahashi | 345/419 |
| 2006/0065869 A1 | 3/2006 | Chipman et al. | |

OTHER PUBLICATIONS

Smith et al., "Volume of fluid (VOF) method for the dynamics of free boundaries", Journal of Computational Physics, vol. 39, issue 1, Jan. 1981, pp. 201-225.*
Hirt et al., "Analysis and design of flashtubes for pressure letdown in autoclave leaching operations", Hydrometallurgy, vol. 81, issue 2, Feb. 2006, pp. 86-99.*
International Search Report and Written Opinion of the International Searching Authority (Canadian Intellectual Property Office) for International Patent Application No. PCT/CA2009/001441, Apr. 15, 2010.
Gerunda, A., "How to size liquid-vapor separators," *Chemical Engineering*, May 4, 1981, pp. 81-84.
Oshinowo L. et al., "Co-simulation in hydromat. process design," *Int. Laterite Nickel Symposium 2004, Pressure Acid Leaching: proc. of symposium held during TMS Annual Meeting in Charlotte, NC*, Mar. 14, 2004, pp. 335-344.
Smith, C.C. et al., "Analysis and design of flashtubes for pressure letdown in autoclave leaching operations," *Hydrometallurgy*, 81 (2006), pp. 86-99.
Pereira, C.J. et al., "Section 19: Reactors," Perry's Chemical Engineers' Handbook, 2008.

* cited by examiner

*Primary Examiner* — Omar Fernandez Rivas
*Assistant Examiner* — Herng-Der Day
(74) *Attorney, Agent, or Firm* — K&L Gates LLP

(57) ABSTRACT

By appropriately designing a flash tube, spraying of abrasive slurry on the vessel walls and impinging the multiphase jet on bottom of the vessel are minimized. By appropriately designing a flash vessel, once the flash tube has been designed, a slurry pool is provided having a volume that is sufficient to dissipate the flash tube exit jet momentum and the mass of entrained carryover products exiting from the vapor outlet is minimized.

11 Claims, 5 Drawing Sheets

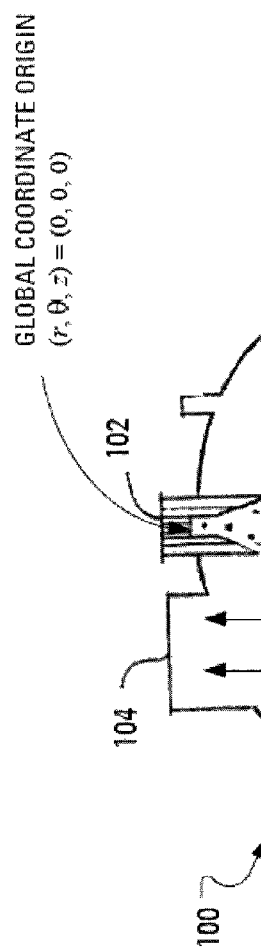
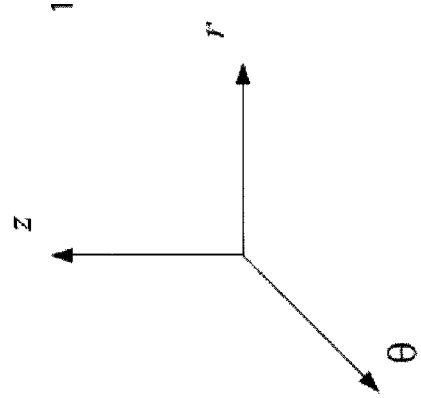
FIG. 1 (PRIOR ART)

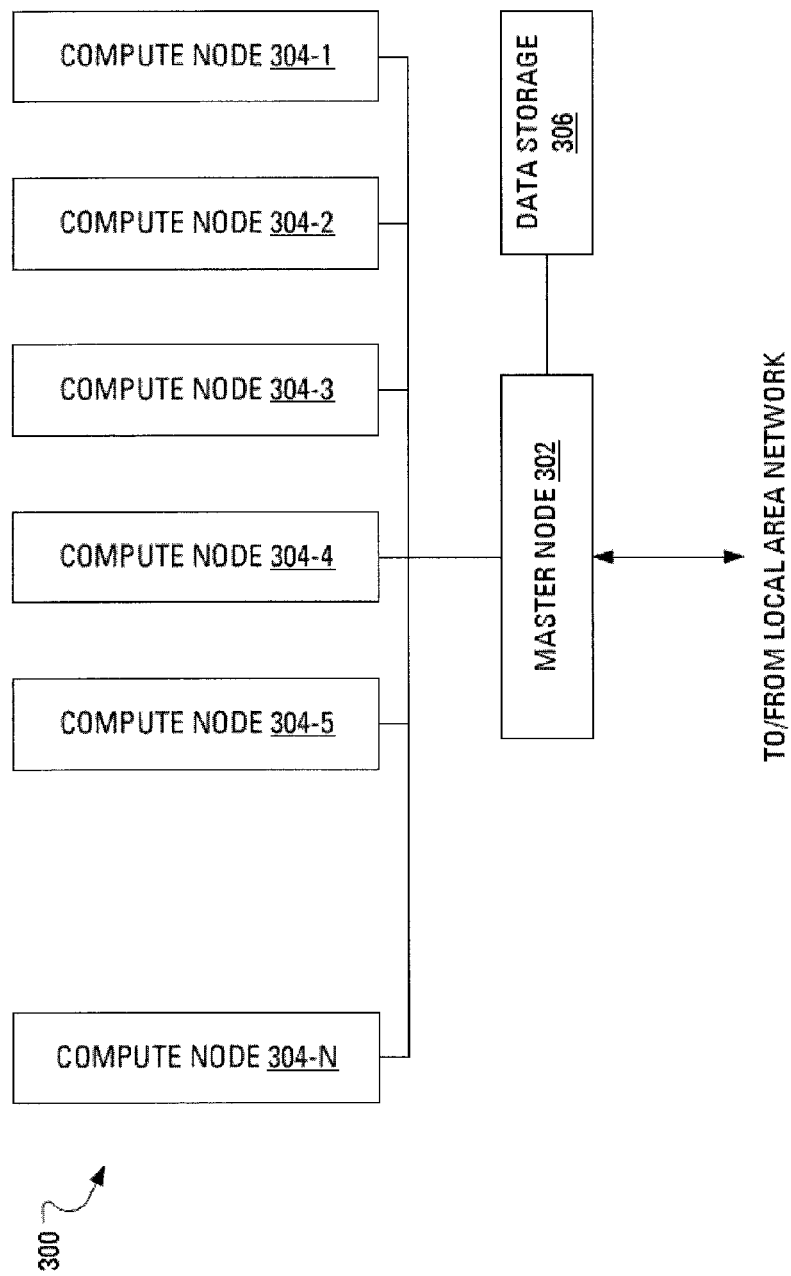

FLASH TUBE AND FLASH VESSEL CONFIGURATION FOR PRESSURE LETDOWN

TECHNICAL FIELD

The present application relates generally to autoclave circuits for processing ore in hydrometallurgical extraction facilities. The present application relates, more specifically, to a pressure letdown portion of the autoclave circuit and, further specifically, to a method of configuring a flash tube and a flash vessel for the pressure letdown portion and a flash tube and a flash vessel designed according to the method. The present application could be applied to any high pressure letdown system containing a slurry or liquid at elevated temperature.

BACKGROUND

Autoclave circuits are used, for example, to recover gold from refractory sulphidic ores and base metals such as nickel, copper and cobalt from oxides or sulphide mineral ores. An aqueous mixture of water, dissolved minerals and solid particulate (slurry) typically leaves an autoclave under high temperature and pressure and is passed to one or more flash vessels in series or parallel. In the flash vessel(s), the pressure of the slurry is reduced and the aqueous fraction rapidly boils to achieve thermodynamic equilibrium, thereby cooling the slurry. Eventually, the slurry pressure and temperature are reduced, by one or more stages of flashing, to atmospheric pressure for further processing.

Once the slurry has reached the flash vessel, the pressure reduction is accomplished by one or more choke valves and "flash tubes" through which the slurry enters the flash vessel. The flash tube is a diffuser nozzle with a conical, frustum-shaped passageway. The flash tube is generally mounted vertically downward inside the flash vessel. While the slurry is in the liquid state before entering the flash tube, the pressure reduction that occurs as the slurry enters the flash tube results in the formation of a gas/vapor phase such that the slurry jet appears to enter the flash vessel as a mixture of liquid-phase slurry, a gas/vapor phase, dissolved minerals and solid particles. Even though a mixture of liquid, gas/vapor and solid enters the flash vessel, the three phases may depart the flash vessel separately.

In a given flash vessel, the gas/vapor that evolves from flashing the aqueous fraction exit from one or more gas/vapor outlets usually located at the top of the vessel. Upon exit from the given flash vessel, the gas/vapor may be recovered and recycled. Recycling of steam may, for instance, involve condensing the steam with autoclave feed slurry in a complementary direct contact condenser for preheating the autoclave ore feed slurry. An inventory of liquid-phase slurry remains in the flash vessel in a slurry pool that can act to dissipate the momentum of the jet from the flash tube. Excess liquid-phase slurry exits the flash vessel via one or more slurry outlets.

A properly designed flash tube should produce a flow field having an exit pressure equal to the vapor pressure inside the flash vessel. If the flash tube exit pressure is greater than the vapor pressure in the flash vessel (back pressure), the exiting mixture of liquid-phase slurry and gas/vapor suddenly expands, creating a flared jet that impinges on the walls of the flash vessel. Normally, the vessel walls are lined with an application-specific lining. The slurry jet resulting from back pressure may lead to erosion of the lining. In the other case, when the flash tube exit has a pressure lower than the vapor pressure in the flash vessel, the exiting mixture contracts, forming a narrow, focused slurry jet that can penetrate the slurry pool and impinge on the bottom lining of the vessel. In some cases, such a high energy three-phase jet can cause extensive damage to the lining of the flash vessel. Often, normal shocks are formed inside the flash tube as well as oblique shocks and reflections downstream of the flash tube in the vessel volume itself due to over-expanded flows

BRIEF DESCRIPTION OF THE DRAWINGS

Reference will now be made to the drawings, which show by way of example, embodiments of the invention, and in which:

FIG. 1 illustrates, in a sectional view, an example flash vessel including an example flash tube;

FIG. 3 illustrates an example computer system configured to implement aspects of the present invention;

DESCRIPTION

Figure 2:
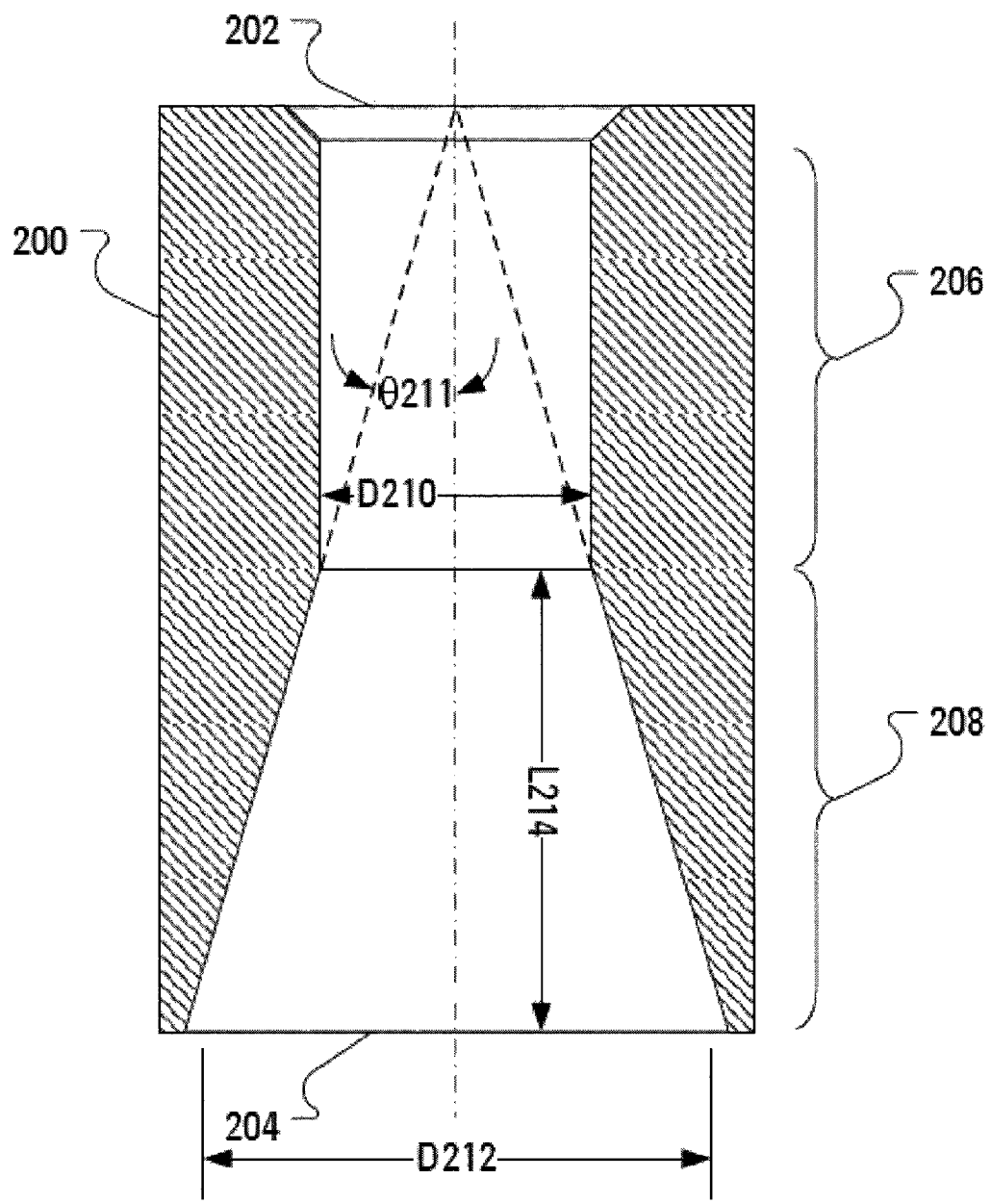
FIG. 2 illustrates, in a sectional view, the example flash tube of FIG. 1.

Autoclaves can be used in the recovery of many metals and for other processes in the realm of mineral processing. Aspects of the present disclosure may be applied to any high pressure letdown system for a slurry or liquid at elevated pressure and/or temperature.

In a method of designing a flash tube, it is sought to: a) approximately equalize the exit pressure of the flash tube to that of the receiving vessel; b) minimize impingement of the abrasive slurry on the vessel walls; and c) minimize impingement of the three-phase jet on the bottom of the vessel. In a method of designing a flash vessel, once the flash tube has been designed, design criteria include a) providing a slurry pool having a volume that is sufficient to dissipate the flash tube exit jet momentum and b) minimizing the mass flow of entrained solids and/or slurry droplets exiting from the vapor outlet(s), referred to hereafter as "carry-over products".

In accordance with one aspect, there is provided an apparatus for receiving and holding a slurry for reducing the pressure of the slurry. The apparatus may comprise a flash vessel having a bottom, a top, side walls, a slurry inlet and a vapor outlet, wherein dimensions of the flash vessel are selected so as to minimize the mass of carry-over products exiting from the vapor outlet, a wear-resistant pressure let down flash tube mounted in the slurry inlet for use in expanding the flashing mixture into the vessel to release energy from the aqueous fraction and reduce the pressure of the slurry, wherein dimensions of the flash tube are selected such that pressure at an exit of the flash tube is greater than, but not more than 1.2 times, the pressure in the flash vessel, and a volume of the slurry in a pool in the bottom of the flash vessel, wherein a depth for the slurry pool is selected to be sufficient to dissipate momentum of an exit jet from the flash tube, such that the impingement velocity of the exit jet is zero at the bottom of the flash vessel.

In accordance with one aspect, there is provided a method of determining dimensions for a flash vessel. The method may comprise receiving initial values for the dimensions for the flash vessel, generating a numerical model of the flash vessel according to said dimensions, the numerical model including a model domain of the flash vessel, simulating an aqueous mixture of water, dissolved metals and solid particulate leaving an autoclave and entering the model domain of the flash vessel via a flash tube mounted in a slurry inlet for use in passing the slurry into the model domain of the flash vessel, and simulating a phase change that accompanies a release of energy from the slurry and a pressure reduction of the slurry, wherein dimensions of the flash tube are selected such that a pressure at an exit of the flash tube is greater than, but not more than 1.2 times, a pressure in the model of the flash vessel. The method may further comprise determining, based on the simulating, that a design criterion has not been met, revising values for the dimensions for the flash tube, thereby producing revised dimensions for an optimized design, generating a revised numerical model of the flash vessel according to the revised dimensions and re-simulating the slurry entering the revised model of the flash vessel. The method may further comprise determining, based on the re-simulating, that a design criterion has been met and, based on the determining, outputting the revised dimensions for the optimized design.

Other aspects and features of the present invention will become apparent to those skilled in the art upon review of the following description of specific embodiments of the invention in conjunction with the accompanying figures.

A flash vessel 100, shown in cross section in FIG. 1, has a typical obround shape, that is, generally cylindrical with an ellipsoid-shaped bottom, an ellipsoid-shaped top and parallel side walls. As shown in FIG. 1, the flash vessel 100 has a slurry inlet 102, a vapor outlet 104, a slurry outlet 106, a manway 108 to permit inspection of the interior of the flash vessel 100 and a drain 110. The flash vessel includes a slurry pool 114. Additionally, a jet 115 is illustrated as entering the flash vessel 100 by way of the slurry inlet 102.

The flash vessel may be defined by dimensions that include: a process diameter $D_{116}$ and a flash vessel height $H_{118}$. One dimension that becomes important in operation is a depth $L_{122}$ of the slurry pool 114. In particular, the difference between the flash vessel height $H_{118}$ and the depth $L_{122}$ of the slurry pool 114 defines a "transport disengagement height" $H_{120}$. According to Perry's Chemical Engineer's Handbook, by managing the depth $L_{122}$ of the slurry pool 114 so that the transport disengagement height $H_{120}$ remains at least half the value of the process diameter $D_{116}$, the concentration of slurry droplets entrained in the vapor departing the flash vessel 100 via the vapor outlet 104 may be minimized.

There was a time when the slurry inlet 102 comprised a choke surrounded by a flash tube through which was defined a passageway that had a consistent cross-sectional area. In U.S. Pat. No. 6,110,255, issued Aug. 29, 2000 to Williams et al. (hereinafter "Williams", the entirety of which is hereby incorporated herein by reference), a nozzle is disclosed. A cross-sectional view of the nozzle, called a flash tube 200 herein, as described by Williams, is illustrated in FIG. 2 as having a first end 202, an opposite second end 204 and a passageway extending through the flash tube 200 from the first end 202 to the second end 204. The flash tube 200 is constructed from a material having high hardness. One preferred material is a sintered alpha phase silicon carbide available from Saint-Gobain Ceramics (of Courbevoie, France) under the trade designation Hexoloy SA™.

The flash tube described by Williams differed from previous flash tubes in the shape of the passageway. Rather than the passageway having a consistent cross-sectional area throughout its length, the passageway described by Williams includes a straight section or "choke bore" 206 and an "expansion cone" zone 208.

The flash tube 200 may be used at the slurry inlet 102 of the flash vessel 100 of FIG. 1 such that slurry passes into the flash tube 200 at the first end 202 and slurry and vapor pass out of the flash tube 200 at the second end 204 to a location inside the flash vessel 100. In the expansion cone zone 208, the passageway flares outwardly from the end of the choke bore 206 that is closest to the first end 202, at a location generally halfway through the passageway, axially outwardly toward the second end 204. Williams discusses a slurry flow rate through the flash tube 200 between about 100 tons per hour and about 500 tons per hour of ore slurry comprising between about 30% and about 70% solids by weight.

Important flash tube dimensions for the prediction and control of flashing behaviour include a diameter $D_{210}$ of the choke bore 206, i.e., the diameter $D_{210}$ of the passageway at the first end 202 of the flash tube 200, and a diameter $D_{212}$ of the exit of the expansion cone zone 208, i.e., the diameter $D_{212}$ of the passageway at the second end 204 of the flash tube 200. Another important dimension helps define the shape of the passageway in the expansion cone zone 208. For instance, the shape of the passageway in the expansion cone zone 208 may be described with a length $L_{214}$ or an expansion half-angle $\theta$ in combination with the input diameter $D_{210}$ and the output diameter $D_{212}$. It was described in Williams that, by careful selection of these dimensions, a relationship can be established between pressure upstream of the flash tube 200 and pressure downstream of the flash tube 200, so that internal wear of the flash tube 200 and the development of shock waves just inside the second end 204 of the flash tube 200 can be minimized. In particular, the flash tube 200 may be designed so that the pressure at the second end 204 is about the same as the pressure in the flash vessel 100.

Williams proposed that the design of the flash tube 200 could substantially reduce known operational impairments, such as shock waves, noise and vibration, in comparison to a system operating under identical conditions (i.e., a "reference" flash vessel), with the only difference being use of a "straight choke" nozzle (i.e., a "reference" nozzle).

The choke bore diameter $D_{210}$ fixes the slurry mass rate of flow entering the flash vessel 100 at a given absolute pressure or, alternatively, fixes the upstream pressure at a given mass rate of flow.

The expansion cone exit diameter $D_{212}$ largely fixes the absolute exit pressure and velocity of the flashing slurry upon entering the flash vessel 100. It was considered important in Williams for the pressure at the second end 204 of the flash tube 200 to match closely the pressure within the flash vessel 100.

In practice, the Applicants have found that when the flash tube 200 that has been designed according to Williams is put into use, the three-phase jet at the output of the flash tube 200 may have enough momentum/energy to erode the lining of the bottom of the flash vessel 100.

In overview, design of the flash tube 200 at the slurry inlet 102 and design of the flash vessel 100 are optimized. In particular, the optimal design avoids impinging the three-phase jet on bottom of the flash vessel 100 and avoids spraying the abrasive liquid-phase slurry on the walls of the flash vessel 100. Once the flash tube 200 has been designed, it is also necessary to design the flash vessel 100 that a) provides sufficient slurry volume to dissipate the flash tube exit jet momentum and b) minimizes carry over products entrained in the vapor exiting through the vapor outlet 104.

An example computer system 300 configured to implement aspects of the present invention is illustrated in FIG. 3. The example computer system 300 includes a master node 302 and a plurality of compute nodes identified as compute node 304-1, compute node 304-2, compute node 304-3, compute node 304-4, compute node 304-5, . . . , and compute node 304-N (individually or collectively 304). Note that the letter N is used to represent any number of compute nodes and not simply 14 of them. The master node 302 is in communication with a data storage unit 306 and with a corporate local area network (not shown).

The master node 302 and the compute nodes 304 may be implemented as multi-core Advanced Micro Devices (AMD) and Intel central processing units. Furthermore, the master node 302 and the compute nodes 304 may be connected via high speed interconnections such as interconnections using the known Gigabit Ethernet protocol. Operating systems contemplated for the master node 302 and the compute nodes 304 include the Windows XP operating system by Microsoft® of Redmond, Wash. and the Linux operating system. Particularly favored distributions of Linux include the distribution provided by Red Hat® of Raleigh, N.C. and the distribution provided by Novell® of Waltham, Mass. Parallel processing is suited to the computationally demanding nature of the iterative numerical method used to solve the discretized conservation equations describing the transport of mass, momentum and energy for a fluid. The computer system 300 is also equipped with a large amount of physical memory (roughly 24 Gigabytes per compute node 304) due to the high memory storage requirements as part of the numerical solution method. Data storage may be accomplished at the data storage unit 306 through the use of Serial Attached SCSI (SAS) hard drives.

Figure 4A:
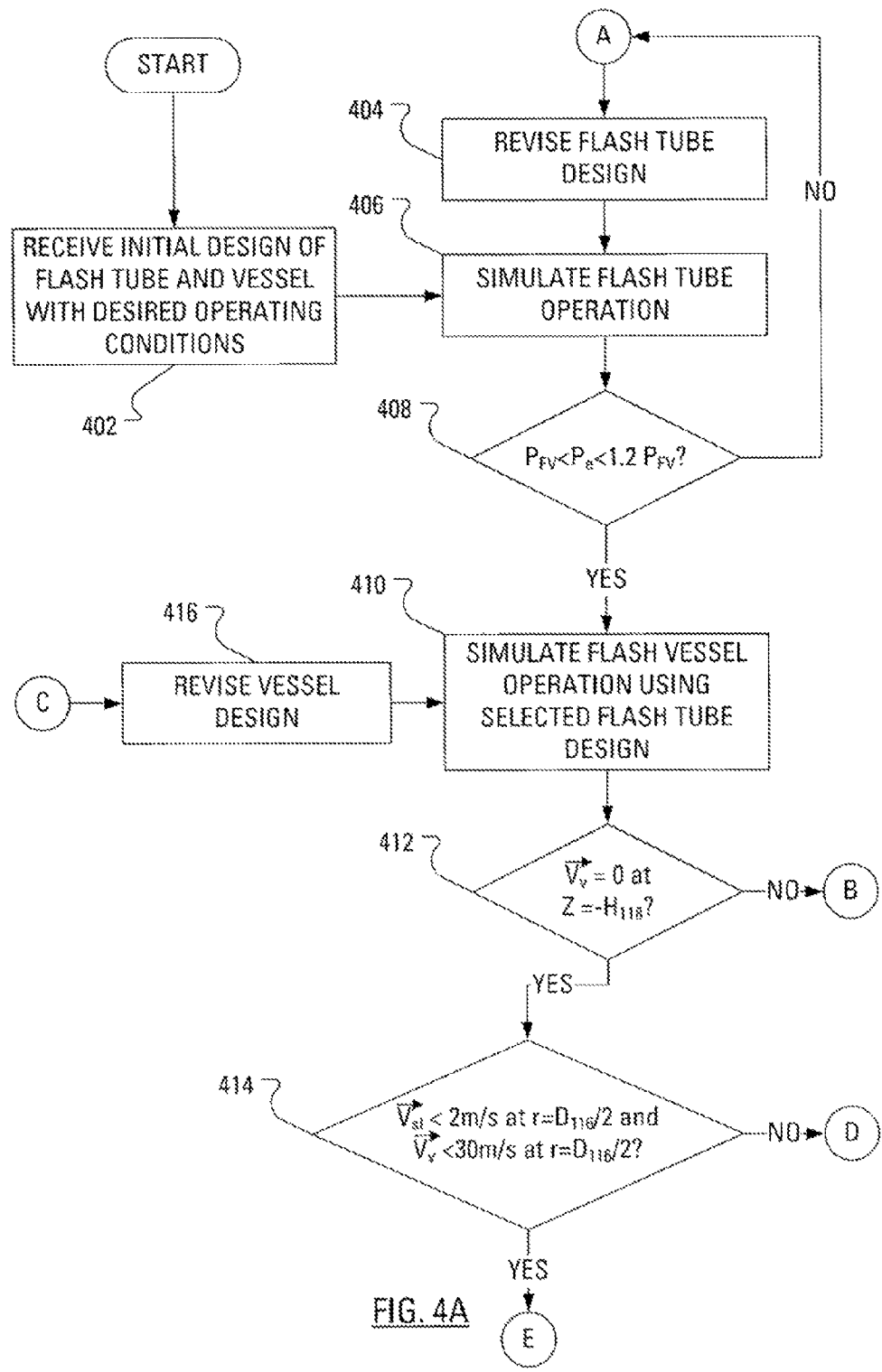
FIG. 4A illustrates steps in a method of optimizing design of the flash tube and the flash vessel of FIG. 1.
Figure 4B:
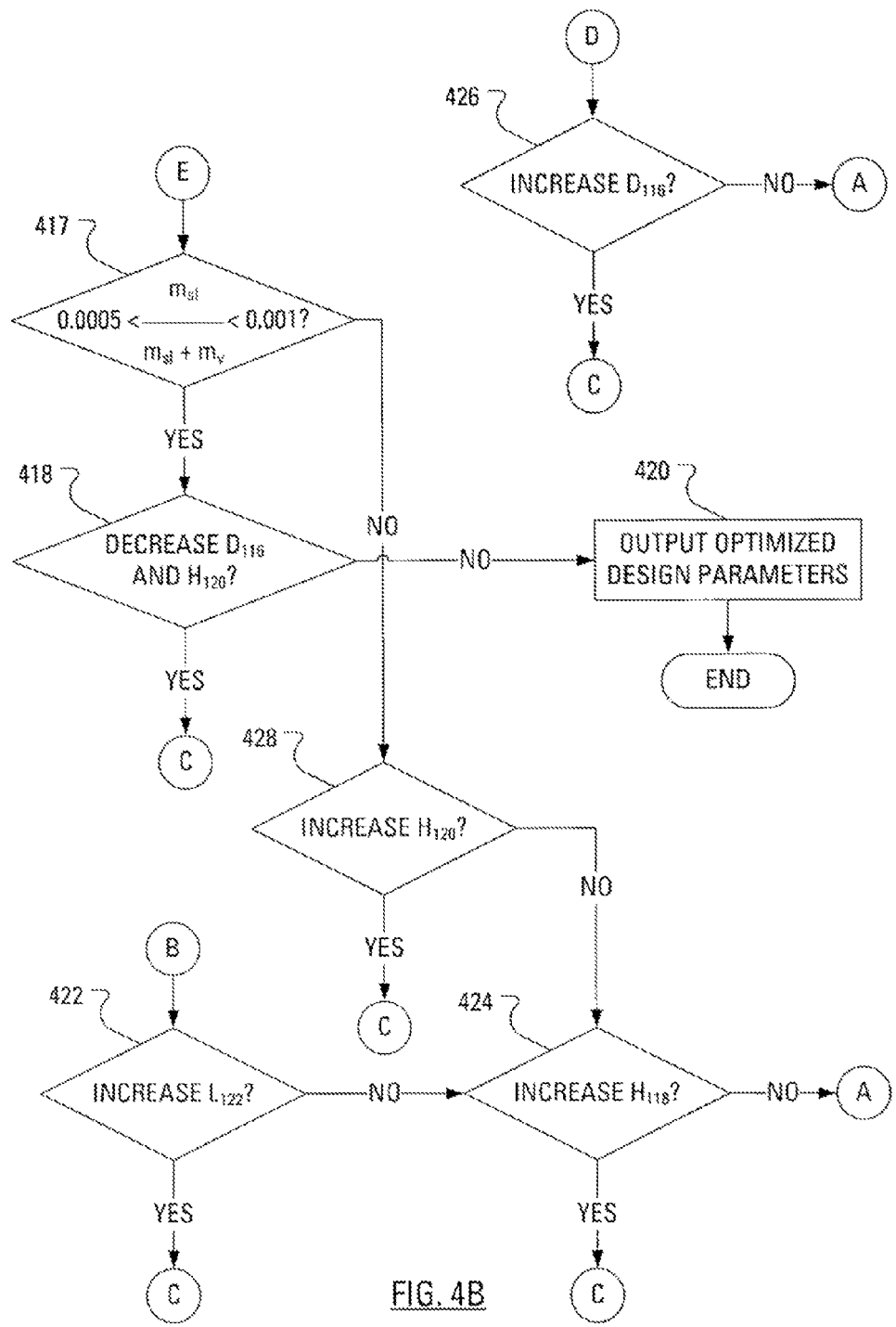
FIG. 4B illustrates steps, additional to the steps in FIG. 4A, in the method of optimizing design of the flash tube and the flash vessel of FIG. 1.

Steps in a general method of optimizing design of the flash tube 200 and flash vessel 100 are illustrated in FIGS. 4A and 4B. Initially, the example computer system 300 receives (step 402) an initial, user-generated design (e.g., a numerical model) for the flash tube 200 and the flash vessel 100.

As will be appreciated by a person of skill in the art, a "numerical model" may be considered to encompass a domain, a set of representative physics/equations to be solved, and a solver algorithm (actual code). In particular, the "domain" refers to the physical space that is being modeled. The physical space can be either a fluid zone or a solid zone. In the case of the flash vessel 100, solid zones are not modeled, the walls of the flash tube 200 and of the flash vessel 100 are assumed to have zero thickness. Therefore, the entire domain is occupied by a fluid zone.

The numerical model of the flash vessel 100 may be developed for a full scale, three-dimensional inside fluid volume model of the flash vessel 100. The geometric details of all major structures that affect fluid motion in the flash vessel 100 may be included in the numerical model. The numerical model of the flash tube 200 may, for example, be a two-dimensional axisymmetric fluid model or may, for another example, be a full three-dimensional inside fluid model. In either case, a global coordinate origin (r, 0, z) is located at the centre of the first end 202 of the flash tube domain.

The initial dimensions for the numerical model of the flash vessel 100 may be determined from equations of state for steady, one dimensional, homogeneous flow. The initial dimensions for the flash tube 200 include: diameter $D_{210}$ of the choke bore 206; the expansion cone exit diameter $D_{212}$; and the length $L_{214}$ of the expansion cone zone 208 or the expansion half-angle $\theta_{211}$. The expansion half-angle $\theta_{211}$ may be determined by solving $$\tan\theta_{211} = \frac{(D_{212} - D_{210})}{2 \cdot L_{214}}.$$

The initial dimensions for the flash vessel 100 include: an initial process diameter $D_{116}$; an initial flash vessel height $H_{118}$; and an initial depth $L_{122}$ for the slurry pool 114, based on empirical equations for jet momentum, disengagement height and entrainment velocity.

Upon receiving a design for the flash tube 200 and the flash vessel 100, the example computer system 300 simulates (step 406) the operation of the flash tube 200.

Subsequent to the simulation (step 406) of the operation of the flash tube 200, the example computer system 300 determines (step 408) whether a first criterion has been met. In an example case, the first criterion is met when pressure at the flash tube exit $P_e$, (referred to above as the second end 204 of the flash tube 200) is not more then 20% higher, and not less than, the pressure, $P_{FV}$, inside the flash vessel, $P_{FV} < P_e < 1.2 P_{FV}$.

Upon determining (step 408) that the first criterion has not been met, the example computer system 300 may revise (step 404) the design of the flash tube 200, simulate (step 406) the operation of the flash tube 200 and, again, determine (step 408) whether the first criterion has been met.

Upon determining (step 408) that the first criterion has been met, the example computer system 300 may simulate (step 410) the operation of the flash vessel 100, using the current design of the flash tube 200.

The simulating (step 406) of the operation of the flash tube 200 and the simulating (step 410) of the operation of the flash vessel 100 may be accomplished using computational fluid dynamic (CFD) modeling for which the liquid-phase slurry, which comprises water, dissolved metals and solid particulate, may be assumed to be homogeneously mixed. The liquid-phase slurry may be treated, during the simulating, as a single-phase slurry of mass-weighted average density. A slurry rheology obtained through lab testing may be implemented in the computer simulation by a user-defined function that calculates the apparent viscosity of the slurry as a function of strain rate in the fluid at any temperature.

There are various rheological models that can be used to characterize the viscosity of the slurry. One of which, for example, is the Herschel-Bulkley model, $$\tau = \tau_0 + K\gamma^n,$$

where $\tau$ is shear stress, in Pascal, $\tau_o$ is yield stress, K is a consistency index, $\gamma$ is a shear rate (per second) and n is a shear index. Apparent viscosity may be calculated as follows, $$\mu = \frac{\tau}{\gamma} = \frac{\tau_0}{\gamma} + K\gamma^{n-1}.$$

The simulating (steps 406, 410) may be performed using a software product named FLUENT and marketed by Fluent Inc., which is a wholly owned subsidiary of ANSYS, Inc. of Canonsburg, Pa.

During the simulating (steps 406, 410), the slurry phase may be simulated as a turbulent, non-isothermal, compressible, multiphase fluid, using thermodynamic equations of state, conservation of mass, momentum and energy along with compressible flow relationships. An equation for conservation of momentum may be expressed as $$\frac{\partial}{\partial t}(\rho \vec{v}) + \nabla \cdot (\rho \vec{v}\vec{v}) = -\nabla p + \nabla \cdot \left[\mu(\nabla \vec{v} + \nabla \vec{v}^T)\right] + \rho \vec{g} + \vec{F}$$

and an equation for conservation of mass of slurry and vapour may be expressed as $$\frac{\partial \rho}{\partial t} + \nabla \cdot (\rho \vec{v}) = 0,$$

where p, $\vec{v}$, ρ, μ and g are pressure, velocity, mixture density, mixture viscosity and acceleration due to gravity, respectively and ∇ is the gradient or first derivative of the indicated vectors and scalar quantities. $\vec{F}$ represents a vector sum of all inertial (body) forces and surface forces acting on a control volume boundary, in this case the flash tube or flash vessel, required to keep the fluid domain stationary.

During the simulating (steps 406, 410), the flashing of the aqueous-phase fluid into vapor-phase fluid may be simulated using established cavitation models or evaporation/condensation phase change models and thermodynamic equilibrium. Additionally or alternatively, further cavitation models or the phase change models may be independently developed and incorporated in the simulation. The mass balance equation for the cavitation model is expressed as:

$$\frac{\partial}{\partial t}(\alpha_v \rho) + \nabla \cdot (\alpha_v \rho \vec{v}_v) = R_e - R_c$$

where ρ, $\alpha_v$, $R_e$ and $R_c$ are mixture density, vapor volume fraction, evaporation rate and condensation rate, respectively. Depending on the cavitation model, $R_e$ and $R_c$ are expressed in terms of slurry parameters, such as pressure, temperature, vapor fraction and density of nucleation sites.

During the simulating (steps 406, 410), the volume fraction of each phase (where $\alpha_{sl}$, $\alpha_v$ are the volume faction of the slurry and vapor, respectively) inside the flash vessel 100 may be tracked separately to obtain the movement of a free surface interface between the vapor-phase fluid and the liquid-phase fluid. A robust numerical technique, termed as the "Volume-Of-Fluid (VOF) method", along with dynamic grid/mesh adaption may be used to accurately capture the transient evolution of the free surface interface. Since the solutions are unsteady, several thousand time-steps may be necessary to achieve a few seconds of pseudo-steady state results, where the term "pseudo-steady state" refers to the condition where the time-averaged free surface location is constant.

Subsequent to the simulation (step 410) of the operation of the flash vessel 100, the example computer system 300 may determine (step 412) whether a second criterion has been met. In an example case, the second criterion is met when the jet 115 does not impinge on the bottom of flash vessel 100: $\vec{V}_v = 0$ at z=−$H_{118}$ (bottom of flash vessel) where $\vec{V}_v$ is the vector resultant velocity of vapor phase at any point on the bottom of the flash vessel domain, i.e. where elevation z=−$H_{118}$.

Upon determining (step 412) that the second criterion has not been met, the example computer system 300 may determine (step 422, FIG. 4B) whether a first design flexibility is present. For example, determining (step 422) whether a first design flexibility is present may comprise determining whether the depth $L_{122}$ for the slurry pool 114 can be increased while keeping the flash vessel height $H_{118}$ constant.

Upon determining (step 422) that the first design flexibility is not present, the example computer system 300 may determine (step 424, FIG. 4B) whether a second design flexibility is present. For example, determining (step 424) whether a second design flexibility is present may comprise determining whether the flash vessel height $H_{118}$ can be increased.

Upon determining (step 424) that the second design flexibility is not present, the example computer system 300 may revise (step 404) the design of the flash tube 200, simulate (step 406) the operation of the flash tube 200 and, again, determine (step 408) whether the first criterion has been met.

Upon determining (step 422) that the first design flexibility is present or determining (step 424) that the second design flexibility is present, the example computer system 300 may revise (step 416, FIG. 4A) the design of the flash vessel 100, simulate (step 410) the operation of the flash vessel 100 and, again, determine (step 412) whether the second criterion has been met.

Upon determining (step 412) that the second criterion has been met, the example computer system 300 may determine (step 414) whether a third criterion has been met. In a first example case, the third criterion is met when the jet 115 does not impinge on the side walls. In a second example case, the third criterion is met when the wall velocity is <2 m/s for slurry and <30 m/s for vapor: $\vec{V}_{sl}$<2 m/s at r=$D_{116}$/2 and $\vec{V}_v$<30 m/s at r=$D_{116}$/2, where $\vec{V}_{sl}$ and $\vec{V}_v$ are the vector resultant velocities of slurry vapor respectively at any point along the vessel wall; i.e., where r=$D_{116}$/2.

Upon determining (step 414) that the third criterion has not been met, the example computer system 300 may determine (step 426, FIG. 4B) whether a third design flexibility is present. For example, determining (step 426) whether a third design flexibility is present may comprise determining whether the process diameter $D_{116}$ can be increased.

Upon determining (step 426) that the third design flexibility is not present, the example computer system 300 may revise (step 404) the design of the flash tube 200, simulate (step 406) the operation of the flash tube 200 and, again, determine (step 408) whether the first criterion has been met.

Upon determining (step 426) that the third design flexibility is present, the example computer system 300 may revise (step 416, FIG. 4A) the design of the flash vessel 100, simulate (step 410) the operation of the flash vessel 100 and, again, determine (step 412) whether the second criterion has been met.

Upon determining (step 414) that the third criterion has been met, the example computer system 300 may determine (step 417) whether a fourth criterion has been met. In an example case, the fourth criterion is met when the carryover amount is acceptable. The carry over amount is considered acceptable when the mass fraction of slurry is between 0.5-1% of the total mass flow leaving the flash vessel domain through vapor outlet nozzle 104:

$$0.0005 < \frac{m_{sl}}{(m_{sl} + m_v)} < 0.001,$$

where $m_{sl}$ is the mass of slurry and $m_v$ is the mass of vapor at location 104 of the flash vessel model domain, (r, θ, z)=($D_{116}$/2, θ, 0).

Upon determining (step 417) that the fourth criterion has not been met, the example computer system 300 may determine (step 428) whether a fourth design flexibility is present. For example, determining (step 428) whether a fourth design flexibility is present may comprise determining whether the transport disengagement height $H_{120}$ can be increased while keeping the flash vessel height $H_{118}$ constant.

Upon determining (step 428) that the fourth design flexibility is not present, the example computer system 300 may determine (step 424) whether the second design flexibility is present. As discussed, determining (step 424) whether a second design flexibility is present may comprise determining whether the flash vessel height $H_{118}$ can be increased.

Upon determining (step 424) that the second design flexibility is not present, the example computer system 300 may revise (step 404) the design of the flash tube 200, simulate (step 406) the operation of the flash tube 200 and, again, determine (step 408) whether the first criterion has been met.

Upon determining (step 428) that the first design flexibility is present or determining (step 424) that the second design flexibility is present, the example computer system 300 may revise (step 416, FIG. 4A) the design of the flash vessel 100, simulate (step 410) the operation of the flash vessel 100 and, again, determine (step 412) whether the second criterion has been met.

Upon determining (step 417) that the fourth criterion has been met, the example computer system 300 may determine (step 418) whether a fifth design flexibility is present. For example, determining (step 418) whether the fifth design flexibility is present may comprise determining whether the size of the flash vessel 100 can be reduced by decreasing the diameter $D_{116}$ and disengagement height $H_{120}=D_{116}/2$.

Upon determining (step 418) that the fifth design flexibility is present, the example computer system 300 may revise (step 416, FIG. 4A) the design of the flash vessel 100, simulate (step 410) the operation of the flash vessel 100 and, again, determine (step 412) whether the second criterion has been met.

Upon determining (step 418) that the fifth design flexibility is not present, the example computer system 300 may output (step 420) the present design parameters. Notably, based on having determined that the present design parameters have met (step 408) the first design criterion, have met (step 412) the second design criterion, have met (step 414) the third design criterion and have met (step 417) the fourth design criterion, the present design parameters may be considered to have been optimized within the constraints imposed by the designer on $L_{122}$, $H_{118}$, $D_{116}$, and $H_{120}$ (design flexibility criteria 1-5).

Previous design methodologies have used empirical calculations to determine such aspects of flash vessel operation as penetration depth of the flash tube exit jet and slurry splashing height. Unfortunately, such empirical calculations may be shown to only provide values for such aspects under steady state conditions. Conveniently, by simulating (step 410, FIG. 4A) start-up conditions and pseudo steady-state conditions, more accurate results may be obtained and a more robust flash vessel design may be realized. Additionally, conveniently, simulating has an advantage over empirical calculations in that a more accurate determination may be made of the aspects of interest because a simulation can represent a multiphase mixture in a manner that empirical calculations cannot. Numerical simulation accounts for the exact full scale geometry of that particular design case, whereas empirical correlations cannot do so because, for example, many jet penetration correlations assume infinite vessel diameter.

Recall that the steam that exits from the flash vessel 100 at the vapor outlet 104 may be recovered and recycled. Recycling of the steam may, for instance, involve condensing the steam with autoclave feed slurry in a complementary direct contact condenser for preheating the autoclave ore feed slurry. In recognition of the tendency of the steam that exits at the steam outlet 104 to include some carry-over products, that is, entrained slurry, a gas cyclone is often employed to remove entrained slurry from the steam before the steam is used to preheat the autoclave ore feed slurry. It is known that the gas cyclone can occasionally become plugged with solid particulate, thereby blocking the passage of the steam. Conveniently, where the flash vessel 100 is designed according to aspects of the present invention to minimize the mass of carry-over products exiting from the steam outlet 104, it may be found that gas cyclone plugging is reduced.

Furthermore, reducing the mass of carry-over products exiting from the steam outlet 104 may lead to reduced corrosion of the piping that carry the steam away from the flash vessel 100 and may reduce any negative environmental effects of carry-over products exiting from the vapor outlet 104 rather than from the slurry outlet 106.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. An apparatus for receiving and holding a slurry for reducing the pressure of said slurry, the apparatus comprising:
   a flash vessel having a bottom, a top, side walls, a slurry inlet and a vapour outlet, wherein dimensions of said flash vessel are selected so as to minimize a mass of carry-over products exiting from said vapour outlet;
   a wear-resistant pressure let down flash tube mounted in said slurry inlet for use in passing an ore slurry into said flash vessel to release energy from said ore slurry and reduce pressure of said ore slurry, wherein dimensions of said flash tube are selected such that pressure at an exit of said flash tube is greater than, but not more than 1.2 times, a pressure in said flash vessel; and
   a volume of said ore slurry in a slurry pool in said bottom of said flash vessel, wherein a depth for said slurry pool is selected to be sufficient to dissipate momentum of an exit jet from said flash tube, such that an impingement velocity of said exit jet is zero at said bottom of said flash vessel;
   wherein said dimensions of said flash vessel, said dimensions of said flash tube and said depth for said slurry pool are selected based on simulating:
      a slurry comprising an aqueous mixture of water, dissolved metals and solid particulate leaving an autoclave and entering a model domain of said flash vessel via said flash tube, and
      a phase change that accompanies a release of energy from said slurry and a pressure reduction of said slurry,
      said simulating including separately tracking a volume fraction of a vapour-phase and a liquid-phase inside said flash vessel to obtain a movement of a free surface interface between said vapour-phase and said liquid-phase.

2. A method of determining dimensions for a flash vessel, said method comprising:
   receiving, at a computer system including a master node and a plurality of compute nodes, initial values for said dimensions for said flash vessel;
   generating, at said computer system, a numerical model of said flash vessel according to said dimensions, said numerical model including a model domain of said flash vessel;

simulating, using said plurality of compute nodes:
- a slurry comprising an aqueous mixture of water, dissolved metals and solid particulate leaving an autoclave and entering said model domain of said flash vessel via a flash tube mounted in a slurry inlet for use in passing said slurry into said model domain of said flash vessel, and
- a phase change that accompanies a release of energy from said slurry and a pressure reduction of said slurry,
- said simulating including separately tracking a volume fraction of a vapour-phase and a liquid-phase inside said flash vessel to obtain a movement of a free surface interface between said vapour-phase and said liquid-phase,
- wherein dimensions of said flash tube are selected such that pressure at an exit of said flash tube is greater than, but not more than 1.2 times, a pressure in said model domain of said flash vessel;

determining, based on said simulating, that a design criterion has not been met;

revising values for said dimensions for said flash tube, thereby producing revised dimensions for an optimized design;

generating a revised numerical model of said flash vessel according to said revised dimensions, said revised numerical model including a revised model domain of said flash vessel;

re-simulating said slurry entering said revised model domain of said flash vessel;

determining, based on said re-simulating, that said design criterion has been met;

based on said determining that said design criterion has been met, outputting said revised dimensions for said optimized design.

3. The method of claim 2 wherein said simulating implements a slurry rheology obtained through lab testing through use of a user-defined function that calculates an apparent viscosity of said slurry as a function of strain rate at any temperature.

4. The method of claim 2 wherein simulating said liquid-phase of said slurry comprises simulating a turbulent, non-isothermal, compressible, multiphase fluid.

5. The method of claim 2 wherein said simulating comprises determining penetration depth of said flash tube exit jet under start-up conditions.

6. The method of claim 2 wherein said simulating comprises determining penetration depth of said flash tube exit jet under pseudo steady-state conditions.

7. The method of claim 2 wherein said simulating comprises simulating flashing of said liquid-phase into said vapour-phase using established cavitation models or phase change models.

8. The method of claim 2 further comprising capturing a transient evolution of said free surface interface using a "Volume-Of-Fluid (VOF) method".

9. The method of claim 8 further comprising capturing said transient evolution of said free surface interface using dynamic grid/mesh adaption.

10. The method of claim 2 wherein said design criterion comprises a slurry pool depth sufficient to dissipate momentum of an exit jet from said flash tube.

11. The method of claim 2 wherein said design criterion comprises a minimization of a mass of entrained carry-over products exiting from a vapour outlet of said flash vessel.

* * * * *